Nov. 24, 1959 H. F. PAUL 2,914,664
APPARATUS FOR FREQUENCY-MODULATION RECEPTION
WITH MEANS FOR MUTING NOISE
Filed March 26, 1956
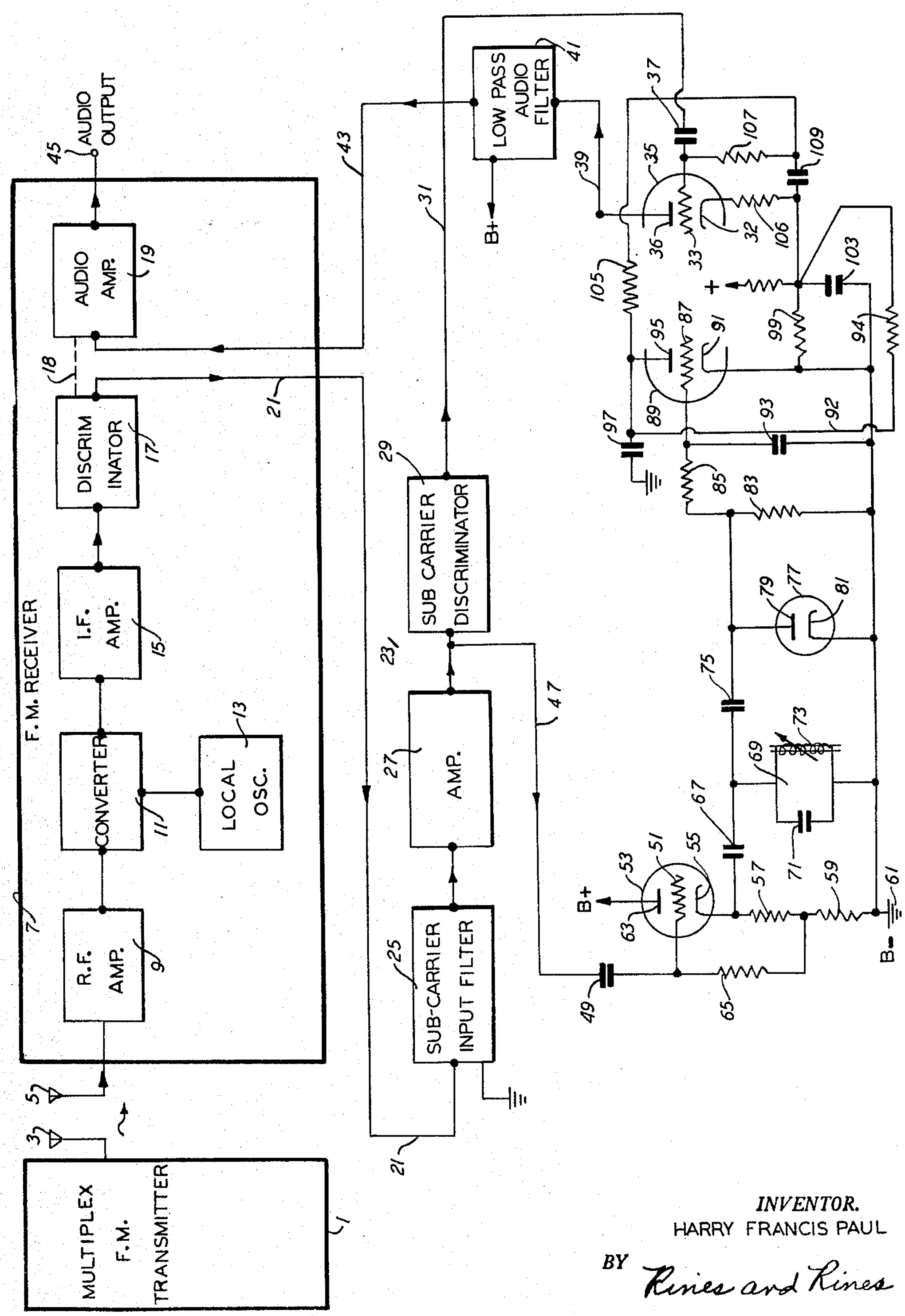
INVENTOR.
HARRY FRANCIS PAUL
BY *Rines and Rines*
ATTORNEYS United States Patent Office 2,914,664

Patented Nov. 24, 1959

2,914,664

APPARATUS FOR FREQUENCY-MODULATION RECEPTION WITH MEANS FOR MUTING NOISE

Harry F. Paul, North Wilmington, Mass., assignor to Browning Laboratories, Inc., Winchester, Mass., a corporation of Massachusetts Application March 26, 1956, Serial No. 574,021

7 Claims. (Cl. 250—6)

The present invention relates to methods of and apparatus for the reception of frequency-modulated radio waves, and, more particularly, the reception of multiplex frequency-modulation transmissions.

Present-day frequency-modulation broadcast transmitters may be used to transmit, simultaneously with the conventional public broadcast program, one or more subsidiary program transmissions carried by super-audible sub-carrier waves, without interfering with the conventional public broadcast program and without interfering one with another. The subsidiary program transmissions may be received by subscribers who desire special programming, such as, for example, hotels, restaurants, stores or public transportation vehicles and the like. Such subscribers may desire background music without the announcements or commercials which are interspersed in the regular public broadcast program. Special programs of other types particularly suited to the needs of the subscribers may also be desired. These subscribers, with the aid of appropriate frequency-modulation receiver systems, may receive the subsidiary transmissions while the general public receives the conventional public broadcast program. Such frequency-modulation multiplexing is described, for example, in an article entitled "Multiplexing F-M Broadcast Transmitters" by John H. Bose, appearing in Electronics, vol. 28, No. 10, October 1955.

Various techniques for producing the multiplex transmissions and for receiving the same have been evolved. The receiving systems, however, have not heretofore been entirely satisfactory for commercial purposes since, when the desired sub-carrier program is cut off, as, for example, in intervals between programming or at the end of a day's operation, background or "cross-talk" signals from other sub-carriers or from the main carrier leak through the receiver equipment, though at low intensity levels, and are detectable. There are also other disadvantages inherent in present-day receivers of this character which have not rendered them entirely satisfactory for general commercial use.

An object of the present invention, accordingly, is to provide a new and improved method of and apparatus for frequency-modulation reception of such multiplex transmissions that shall not be subject to the above-described disadvantages, and that, to the contrary, completely obviates these difficulties.

A further object is to provide such a receiver that automatically blocks the reproduction apparatus in periods when the desired sub-carrier programming ceases.

Other and further objects will be explained hereinafter and will be more particularly pointed out in the appended claims.

In summary, the invention resides in the utilization of a first frequency-modulation receiver for receiving a main frequency-modulated carrier wave containing, for example, an audio-signal-frequency-modulated sub-carrier wave. After discrimination of the main frequency-modulated carrier wave in the first frequency-modulation receiver, the audio-signal-frequency-modulated sub-carrier wave is selected therefrom and is applied to a second frequency-modulation receiver. Means is provided responsive to the discriminated frequency-modulated sub-carrier wave in the second receiver for producing an output signal corresponding to the modulation of the sub-carrier wave. A further circuit is provided which is connected between the first and second receivers and is responsive to the presence or absence of the sub-carrier wave for respectively rendering the output-signal-producing means operative and inoperative to produce the output signal. Preferred constructional details are hereinafter set forth.

The invention will now be explained in connection with the accompanying drawing, the single figure of which is a schematic circuit diagram illustrating the invention in preferred form.

Referring to the drawing, a multiplex frequency-modulation transmitter is shown at 1 transmitting a conventional frequency-modulation broadcast to the public along a main carrier-wave channel and carrying, also, one or more subsidiary super-audible sub-carrier waves that are, in turn, modulated with special programs for the special subscriber services before discussed. These transmissions are shown transmitted by an antenna 3 to a receiving antenna 5 at a subscriber station. The antenna 5 will pick up the complete transmission from the transmitter 1 and will feed it to a first frequency-modulation receiver 7 which may, for example, be of the type described in Rider's Specialized HI-FI AM-FM Manual No. 7001, volume 1, pages 39 to 50.

For purposes of simplicity, the frequency-modulation receiver 7 is shown comprising radio-frequency amplifier stages 9, labelled R.F. Amp., which feed the received energy to a converter 11 for mixing with oscillations from a local oscillator 13, which is preferably crystal-controlled. The lower or intermediate frequencies that result from such conversion are amplified in intermediate-frequency amplifier stages 15, labelled I.F. Amp., and applied to a conventional frequency-modulation discriminator 17, preferably provided with appropriate preceding limiting stages, as is well known in the art. Ordinarily, in the conventional frequency-modulation receiver, the discriminator 17 would feed audio amplifier stages 19, as by the dotted-line conductor 18, and reproduction or recording apparatus would be connected to the audio amplifier output terminal 45, labelled Audio Output. In accordance with the present invention, however, the discriminator 17 does not feed directly to the audio amplifier 19 but it feeds, rather, by a conductor 21 to a second frequency-modulation receiver generally indicated by the numeral 23. Connected to the input of the second receiver 23 is a filter 25, labelled "Sub-Carrier Input Filter."

The main channel carrier wave is de-modulated at the main channel discriminator 17 so that what appears along the input conductor 21 to the sub-carrier input filter 25 is the main channel modulation carrying one or more subsidiary super-audible sub-carrier waves which, in turn, are modulated with the desired subscriber-service program modulations. The sub-carrier input filter 25 is tuned to the desired subscriber sub-carrier frequency to select the desired sub-carrier wave from the main channel modulation. The selected sub-carrier wave is then fed to appropriate amplifiers 27 and thence to a sub-carrier discriminator 29 which recovers or reproduces the modulation or program intelligence carried by the sub-carrier wave. This reproduced signal, corresponding to the modulation of the subcarrier wave at the transmitter 1, is fed by conductor 31 through a coupling condenser 37 to the control-grid electrode 33 of an additional audio amplifier stage, illustrated as a triode 35. The output of the audio amplifier 35 is shown fed from its plate or anode 36 by conductor 39, preferably through a low-pass audio filter 41 and by conductor 43, to the audio amplifier 19 associated with the first frequency-modulation receiver 7. The audio amplifier 35 may therefore be considered either as part of the second frequency-modulation receiver 23 or as a first audio-amplifying stage for the first frequency-modulation receiver 7. There will thus be available, at the audio output terminal 45, an output signal corresponding to the desired modulation programming carried by the subsidiary sub-carrier-wave channel. The audio amplifiers 35 and 19 will, of course, respond to the modulation signal and produce signals for reproduction or recording at the output terminal 45.

During the periods between the program transmissions of the sub-carrier wave, the cross-talk or leakage of other programs through the frequency-modulation receiver 7 to the audio output 45 would ordinarily occur, as previously discussed. While these effects can not normally be heard during the actual programming along the sub-carrier wave, music or other programs carried by other sub-carrier waves or by the main broadcast channel itself can be heard faintly at the audio output 45 during periods of quiescence of the sub-carrier-wave transmission. This is disturbing and distracting to the subscriber. In accordance with the present invention, an automatic means is provided for automatically blocking or muting the audio-amplifier output so that such disturbing effects can not be produced. This blocking or muting is accomplished by feeding a part of the audio-signal-frequency-modulated sub-carrier wave that is amplified in the amplifier 27 of the second frequency-modulation receiver 23 by means of conductor 47 and the coupling condenser 49 to the control-grid electrode 51 of a cathode-follower stage 53. The cathode load connected to the cathode 55 of the cathode-follower 53 is shown comprising a pair of resistors 57 and 59 the latter of which may be grounded, as at 61. The plate or anode 63 of the cathode-follower 53 is shown connected to the positive terminal of the anode or plate-supply voltage source B+, the negative terminal B— of which may be grounded at the connection 61. Connected between the control-grid electrode 51 and the cathode 55 is a grid-to-cathode resistor 65 the lower terminal of which connects to the point of connection of the cathode-load resistors 57 and 59. The output of the cathode follower is shown coupled by the condenser 67 to a tuned resonant circuit 69. The circuit 69 is illustrated as comprising a condenser 71 connected in parallel with a variable tuning inductor 73. This tuned circuit 69 is tuned to the sub-carrier-wave frequency so that, in the presence of a component of that frequency, there is conveyed through the further coupling condenser 75, a signal for rectification by a rectifier 77. The anode or plate 79 of the rectifier 77 is connected to the right-hand terminal coupling condenser 75. The cathode 81 of the rectifier 77 is connected to the ground terminal 61. If desired, the rectifier 77 may comprise a second half of a double-triode electron tube embodied in the same envelope as the cathode-follower tube 53, the plate and grid of the second half of the triode being connected together to serve as the rectifier anode.

The rectified energy is developed across a resistor 83 and is applied through a grid resistor 85 to the control-grid electrode 87 of a direct-current amplifier stage 89. The cathode 91 of the amplifier 89 is shown connected to the ground terminal 61. A capacitor 93 by-passes alternating-current components that may be applied to the grid 87 to the ground terminal 61. The plate or anode 95 of the amplifier stage 89 is shown connected by conductor 92 through a load 94 to a positive potential terminal +, and is decoupled to ground through the capacitor 97. The cathode 91 of the amplifier 89 is positively biased through a resistor 99 from the positive terminal +, being decoupled to ground through a capacitor 103. The terminal + also supplies positive bias through the cathode resistor 106 to the cathode 32 of the previously mentioned audio-amplifier stage 35. Again, if desired, the direct-current amplifier 89 and the audio amplifier 35 may comprise adjacent sections of a double-triode electron tube having a single envelope, or they may comprise separate tubes. It will be observed that the plate or anode 95 of the direct-current amplifier 89 is connected through a coupling resistor 105 to the lower terminal of the grid resistor 107 of the audio amplifier 35, the upper terminal of which is connected to the control-grid electrode 33. The lower terminal of the grid resistor 107 is coupled through a condenser 109 to the lower terminal of the cathode resistor 106 of the audio amplifier 35. Depending upon whether the audio amplifier 89 is conducting heavily or is substantially cut off, therefore, different bias voltages will be applied between the control-electrode 33 and the cathode 32 of the audio amplifier 35. The operation of the direct-current amplifier 89, therefore, determines whether the audio amplifier 35 is permitted to operate so as to amplify and pass output signals by conductors 39 and 43 ultimately to the output terminal 45, or whether the audio amplifier 35 is cut off and blocks any output-signal path to the audio output terminal 45.

So long as the desired sub-carrier wave is being received along the main carrier-wave transmission and a component thereof is applied by conductor 47 to the cathode follower 53, as before described, there will result response in the tuned circuit 69 to such component of the sub-carrier wave and the production of a rectified voltage in the rectifier 77. The rectified voltage will be amplified by the direct-current amplifier 89 and will effect appropriate biasing of the audio amplifier 35 to permit the same to pass the recovered modulation signal fed from the sub-carrier discriminator 29 by conductor 31 to the audio amplifier 35. An output signal corresponding to the modulation of the sub-carrier wave, therefore, is permitted to pass through the low-pass filter 41 along the conductor 43 and through the audio amplifier 19 to the audio output terminal 45. When, however, the sub-carrier component is lost from the main carrier wave, no such rectified energy is produced by the rectifier 77 and a cut-off bias is applied by the direct-current amplifier 89 to block the operation of the audio amplifier 35 and thus to prevent the passage of any signal into the audio output terminal 45. No cross-talk or other spurious signal can therefore reach the audio output 45 during intervals between programming operations along the subscribed sub-carrier wave.

The present invention also provides for cutting off all signal from the audio output terminal 45 in the event that the main carrier wave should become lost. In such an event, the circuit is designed such that the noise of the frequency-modulation receiver 7 does not provide enough rectified voltage to cut off the direct-current amplifier 89, so that the output channel to the audio output terminal 45 is thus effectively blocked. In accordance with the present invention, therefore, not only is the subscriber not disturbed by cross-talk, but the system is automatically completely blocked when the transmitter station goes off the air.

Since, as before stated, the audio amplifier 35 may be considered either as associated with the first frequency-modulation receiver 7 or the second frequency-modulation receiver 23, the invention can be said to be applicable to rendering either receiver or both receivers inoperative to produce an output signal when the sub-carrier wave is lost from the main carrier wave. While the blocking is shown as preferably effected in the audio amplifier stage, it may, however, be effected elsewhere in the receivers.

Further modifications will occur to those skilled in the art and all such are considered to fall within the spirit and scope of the invention, as defined in the appended claims.

What is claimed is:

1. A receiving system having, in combination, a first frequency-modulation receiver provided with means for discriminating a main frequency-modulated carrier wave containing an audio-signal-frequency-modulated sub-carrier wave, means connected with the discriminating means for selecting the audio-signal-frequency-modulated sub-carrier wave from the received main frequency-modulated carrier wave, a second frequency-modulation receiver connected to the selecting means and provided with further means for discriminating the selected audio-signal-frequency-modulated sub-carrier wave, audio amplifier means connected with the further discriminating means and responsive to the discriminated frequency-modulated sub-carrier wave for producing an audio output signal corresponding to the modulation of the sub-carrier wave, and an electric circuit connected to receive a part of the selected audio-signal-frequency-modulated sub-carrier wave and connected between the second receiver and the audio amplifier means and comprising a cathode follower for receiving the said part of the selected audio-signal-frequency-modulated sub-carrier wave, a circuit tuned to respond to the sub-carrier wave, a rectifier, a direct-current amplifier connected to the rectifier, and means for connecting the direct-current amplifier to the audio amplifier means to bias the same in order to permit its operation in the presence of rectified energy from the rectifier, resulting from rectification of the sub-carrier wave, and to block the operation of the audio amplifier means in the absence of such rectified energy.

2. A receiving system as claimed in claim 1 and in which means is provided whereby the noise generated in the first receiver in the absence of reception of the main carrier wave is of such magnitude as to cause the said electric circuit to produce a bias sufficient to block the audio amplifier means.

3. A receiving system having, in combination, a first frequency-modulation receiver provided with means for discriminating a main frequency-modulated carrier wave containing an audio-signal-frequency-modulated sub-carrier wave, means connected with the discriminating means for selecting the audio-signal-frequency-modulated sub-carrier wave from the received main frequency-modulated carrier wave, a second frequency-modulation receiver connected to the selecting means and provided with radio-frequency amplifying means and further means for discriminating the selected and amplified audio-signal-frequency-modulated sub-carrier wave, audio amplifier means connected with the further discriminating means and responsive to the discriminated frequency-modulated sub-carrier wave for producing an audio output signal corresponding to the modulation of the sub-carrier wave, and an electric circuit connected to receive a part of the selected frequency-modulated sub-carrier wave and connected between the second-receiver radio-frequency amplifying means and the audio amplifier means and comprising a cathode follower for receiving the said part of the selected audio-signal-frequency-modulated sub-carrier wave, a circuit tuned to respond to the sub-carrier wave, a rectifier, a direct-current amplifier connected to the rectifier, and means for connecting the direct-current amplifier to the audio amplifier means to bias the same in order to permit its operation in the presence of rectified energy from the rectifier, resulting from rectification of the sub-carrier wave, and to block the operation of the audio amplifier means in the absence of such rectified energy.

4. A receiving system having, in combination, a first frequency-modulation receiver provided with means for discriminating a main frequency-modulated carrier wave containing an audio-signal-frequency-modulated sub-carrier wave, means connected with the discriminating means for selecting the audio-signal-frequency-modulated sub-carrier wave from the received main frequency-modulated carrier wave, a second frequency-modulation receiver connected to the selecting means and provided with further means for discriminating the selected audio-signal-frequency-modulated sub-carrier wave, audio amplifier means connected with the further discriminating means and responsive to the discriminated frequency-modulated sub-carrier wave for producing an audio output signal corresponding to the modulation of the sub-carrier wave, and an electric circuit connected to receive a part of the selected audio-signal-frequency-modulated sub-carrier wave and connected between the second receiver and the audio amplifier means and comprising a circuit tuned to respond to the sub-carrier wave, a cathode follower for receiving the said part of the selected audio-signal-frequency-modulated sub-carrier wave, a rectifier, and means for connecting the rectifier to the audio amplifier means to bias the same in order to permit its operation in the presence of rectified energy from the rectifier, resulting from rectification of the sub-carrier wave, and to block the operation of the audio amplifier means in the absence of such rectified energy.

5. A receiving system as claimed in claim 4, and in which means is provided whereby the noise generated in the first receiver in the absence of reception of the main carrier wave is of such magnitude as to cause the said electric circuit to produce a bias sufficient to block the audio amplifier means.

6. A receiving system having, in combination, a first frequency-modulation receiver provided with means for discriminating a main frequency-modulated carrier wave containing an audio-signal-frequency-modulated sub-carrier wave, means connected with the discriminating means for selecting the audio-signal-frequency-modulated sub-carrier wave from the received main frequency-modulated carrier wave, a second frequency-modulation receiver connected to the selecting means and provided with further means for discriminating the selected audio-signal-frequency-modulated sub-carrier wave, audio amplifier means connected with the further discriminating means and responsive to the discriminated frequency-modulated sub-carrier wave for producing an audio output signal corresponding to the modulation of the sub-carrier wave, and an electric circuit connected between the second-receiver amplifying means and the audio amplifier means and comprising a tuned circuit for receiving and responding to a part of the selected audio-signal-frequency-modulated sub-carrier wave, a rectifier connected to the tuned circuit, and means for connecting the rectifier to the audio amplifier means to bias the same in order to permit its operation in the presence of rectified energy from the rectifier, resulting from rectification of the sub-carrier wave, and to block the operation of the audio amplifier means in the absence of such rectified energy.

7. A receiving system as claimed in claim 6 and in which means is provided whereby the noise generated in the first receiver in the absence of reception of the main carrier wave is of such magnitude as to cause the said electric circuit to produce a bias sufficient to block the audio amplifier means.

References Cited in the file of this patent

UNITED STATES PATENTS

| | | |
|---|---|---|
| 2,233,183 | Roder | Feb. 25, 1941 |
| 2,358,382 | Carlson | Sept. 19, 1944 |
| 2,370,216 | Worcester | Feb. 27, 1945 |
| 2,379,720 | Koch | July 3, 1945 |
| 2,493,446 | Crosby | Jan. 3, 1950 |
| 2,802,939 | Klehfoth | Aug. 13, 1957 |

FOREIGN PATENTS

| | | |
|---|---|---|
| 479,658 | Great Britain | Feb. 9, 1938 |